US011368471B2

United States Patent
Yi et al.

(10) Patent No.: US 11,368,471 B2
(45) Date of Patent: Jun. 21, 2022

(54) SECURITY GATEWAY FOR AUTONOMOUS OR CONNECTED VEHICLES

(71) Applicant: Beijing Voyager Technology Co., Ltd., Beijing (CN)

(72) Inventors: Xiaoyong Yi, Fremont, CA (US); Alexander Burt, San Jose, CA (US); Jiang Zhang, San Jose, CA (US); Fengmin Gong, Los Altos Hills, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 240 days.

(21) Appl. No.: 16/459,366

(22) Filed: Jul. 1, 2019

(65) Prior Publication Data

US 2021/0006571 A1 Jan. 7, 2021

(51) Int. Cl.
*H04L 9/40* (2022.01)
*H04L 12/40* (2006.01)

(52) U.S. Cl.
CPC .......... *H04L 63/1416* (2013.01); *H04L 12/40* (2013.01); *H04L 63/102* (2013.01); *H04L 63/20* (2013.01); *H04L 2012/40215* (2013.01)

(58) Field of Classification Search
CPC ... H04L 63/1416; H04L 63/102; H04L 63/20; H04L 63/14; H04L 63/1425; H04L 63/1441; H04L 63/45; H04L 12/40; H04L 2012/40215; H04L 2012/4026; H04L 2012/40267; H04L 2012/40273
USPC ..................................................... 726/23, 11
See application file for complete search history.

(56) References Cited

U.S. PATENT DOCUMENTS

| | | | |
|---|---|---|---|
| 8,989,914 B1* | 3/2015 | Nemat-Nasser | G07C 5/08 701/1 |
| 9,560,061 B2* | 1/2017 | Wilding | H04L 63/0245 |
| 10,501,055 B1* | 12/2019 | Yi | B60R 25/257 |
| 10,555,112 B2* | 2/2020 | Williams | G07F 17/3237 |
| 2009/0228204 A1* | 9/2009 | Zavoli | G01C 21/30 701/532 |
| 2013/0200991 A1* | 8/2013 | Ricci | B60K 37/06 340/4.3 |
| 2014/0215491 A1* | 7/2014 | Addepalli | H04W 52/0219 719/313 |
| 2014/0236472 A1* | 8/2014 | Rosario | G08G 1/096741 701/400 |
| 2014/0282470 A1* | 9/2014 | Buga | G06F 8/65 717/170 |
| 2014/0306814 A1* | 10/2014 | Ricci | G08G 1/01 340/425.5 |

(Continued)

*Primary Examiner* — Kambiz Zand
*Assistant Examiner* — Mahabub S Ahmed
(74) *Attorney, Agent, or Firm* — Sheppard Mullin Richter & Hampton LLP

(57) ABSTRACT

Methods, systems, and apparatus, including computer programs encoded on computer storage media, for a system associated with a vehicle are provided. One of the systems includes one or more electronic control units (ECUs) connected to a controller area network (CAN) bus, one or more infotainment devices, and a security gateway coupled to the one or more ECUs via the CAN bus and connected to the one or more infotainment devices. The security gateway may be configured to receive signals from the CAN bus and the one or more infotainment devices and detect a security event based at least in part on received signals.

18 Claims, 6 Drawing Sheets

(56) References Cited

U.S. PATENT DOCUMENTS

| | | | | |
|---|---|---|---|---|
| 2014/0309790 A1* | 10/2014 | Ricci | ................. | G08B 29/188 |
| | | | | 700/276 |
| 2014/0309806 A1* | 10/2014 | Ricci | ................. | G06Q 10/20 |
| | | | | 701/1 |
| 2015/0020152 A1* | 1/2015 | Litichever | ........... | H04L 63/14 |
| | | | | 726/1 |
| 2015/0191135 A1* | 7/2015 | Ben Noon | ......... | H04L 63/1408 |
| | | | | 726/22 |
| 2015/0193885 A1* | 7/2015 | Akiva | ................ | G07C 5/0841 |
| | | | | 705/4 |
| 2016/0244067 A1* | 8/2016 | Hunt | .................. | B60W 30/143 |
| 2016/0328254 A1* | 11/2016 | Ahmed | ........... | G06F 9/45558 |
| 2016/0328272 A1* | 11/2016 | Ahmed | ............ | G06F 9/4881 |
| 2017/0105104 A1* | 4/2017 | Ulmansky | .......... | H04B 1/3822 |
| 2017/0215071 A1* | 7/2017 | Jayanthi | ............ | H04W 4/02 |
| 2017/0295188 A1* | 10/2017 | David | ................ | H04L 63/101 |
| 2017/0313323 A1* | 11/2017 | Tseng | ................ | B60W 10/00 |
| 2018/0099678 A1* | 4/2018 | Absmeier | .......... | A61B 5/4803 |
| 2018/0300477 A1* | 10/2018 | Galula | ............... | H04L 63/1416 |
| 2019/0050634 A1* | 2/2019 | Nerayoff | ............. | G08G 1/017 |
| 2019/0077455 A1* | 3/2019 | Park | ...................... | B60N 2/24 |
| 2019/0181982 A1* | 6/2019 | Hardacker | ....... | H04L 12/40045 |
| 2019/0238555 A1* | 8/2019 | Buffard | .............. | H04L 63/123 |
| 2019/0258251 A1* | 8/2019 | Ditty | .................... | G06V 20/58 |
| 2019/0259227 A1* | 8/2019 | Oesterling | ........... | G07C 5/008 |
| 2019/0281052 A1* | 9/2019 | Lekkas | ................ | H04L 9/14 |
| 2019/0305962 A1* | 10/2019 | Takemori | ............ | H04L 9/3234 |
| 2019/0379683 A1* | 12/2019 | Overby | ............... | H04L 67/322 |
| 2020/0012239 A1* | 1/2020 | Yamamoto | ............ | G05B 15/02 |
| 2020/0047687 A1* | 2/2020 | Camhi | ................. | G10L 15/22 |
| 2020/0169555 A1* | 5/2020 | Chung | ................ | H04L 63/0236 |
| 2020/0177398 A1* | 6/2020 | Takemori | ........... | H04L 63/0823 |
| 2020/0211301 A1* | 7/2020 | Zhang | ................ | H04L 63/065 |
| 2020/0213287 A1* | 7/2020 | Zhang | ................ | H04L 63/064 |
| 2020/0312051 A1* | 10/2020 | Nishikawa | .......... | G07C 5/0841 |
| 2020/0389453 A1* | 12/2020 | Kamir | ................. | G06F 21/554 |
| 2020/0394921 A1* | 12/2020 | Lee | ...................... | G01S 19/14 |
| 2021/0075807 A1* | 3/2021 | Park | ................... | H04L 63/1425 |
| 2021/0356279 A1* | 11/2021 | Szigeti | .............. | G06Q 30/0639 |

* cited by examiner

SECURITY GATEWAY FOR AUTONOMOUS OR CONNECTED VEHICLES

TECHNICAL FIELD

This application relates generally to network security technologies, and more specifically, to a security gateway for autonomous or connected vehicles.

BACKGROUND

An autonomous vehicle may be capable of sensing its environment and automatically move with little or no human input. The autonomous vehicle may comprise an autonomous driving system (ADS) that may collect road and traffic information from various sensors installed on the vehicle or from one or more external systems and, based on these information, perform assisted driving or full self-driving of the vehicle.

Various components on a vehicle may communicate with each other through one or more in-vehicle networks (e.g., a controller area network (CAN)) and communicate with one or more external systems via one or more external networks (e.g., a Wi-Fi network, a cellular network, a GPS network). Such communication may give rise to security risks for the components, such as virus attacks, malicious tempering, hacking, or information theft. The components at risk may comprise, for example, the ADS, an infotainment system, a user panel, an electronic control unit (ECU), a sensor, or a storage device. The interconnectivity of different components may make it more difficult to manage the security risks. For example, the ADS may have access to the Internet via one or more network interfaces that are also connected to an infotainment system associated with the vehicle. An attacker may gain access to the ADS by attacking other components connected to the in-vehicle network (e.g., the infotainment system). Conventional in-vehicle security systems may protect different components at risk separately. For example, a security gateway may only be configured to target security events associated with TCP/IP communications. Such systems may require significant efforts to separately manage security solutions for different in-vehicle devices. Furthermore, certain in-vehicle devices may be left without protection, especially with respect to security risks from the interconnection between different in-vehicle components. For example, a security gateway configured to protect TCP/IP communications to the infotainment system may not sufficiently protect against threats to devices connected to a CAN (e.g., an ADS, a ECU).

SUMMARY

Various embodiments of the present disclosure may include systems, methods, and non-transitory computer readable media for managing network security of a vehicle.

One aspect of the present disclosure is directed to a system associated with a vehicle. The system may comprise one or more electronic control units (ECUs) connected to a controller area network (CAN) bus, one or more infotainment devices, and a security gateway coupled to the one or more ECUs via the CAN bus and connected to the one or more infotainment devices. The security gateway may be configured to receive signals from the CAN bus and the one or more infotainment devices and detect a security event based at least in part on received signals.

In some embodiments, to detect a security event, the security gateway may be configured to perform correlation analysis on the signals from the CAN bus and the signals from the one or more infotainment devices and detect a security event based on a result of the correlation analysis.

In some embodiments, the security gateway may be connected to an autonomous driving controller that is coupled to the ECUs via the CAN bus. The security gateway may be further configured to receive one or more signals from the autonomous driving controller and detect a security event further based on the one or more signals from the autonomous driving controller.

In some embodiments, the security gateway may be connected to one or more sensors associated with the vehicle. The security gateway may be further configured to receive one or more signals from the one or more sensors and detect a security event further based on the one or more signals from the one or more sensors.

In some embodiments, the one or more sensors may comprise one or more image sensors, one or more radar sensors, one or more light detection and ranging (LiDAR) sensors, one or more ultrasonic sensors, one or more inertial measurement units, or one or more GPS receivers.

In some embodiments, the security gateway may be further configured to verify an identify of a person in the vehicle based at least in part on the one or more signals from the one or more sensors.

In some embodiments, the security gateway may be connected to one or more network interfaces. The security gateway may be further configured to receive one or more signals from the one or more network interfaces and detect a security event further based on the one or more signals from the one or more network interfaces.

In some embodiments, the one or more network interfaces may comprise a Wi-Fi client, a cellular modem, or a Bluetooth module.

In some embodiments, the one or more signals may comprise a data packet corresponding to a network address. The security gateway may be further configured to determine that the network address is not among a plurality of pre-stored network address, generate a log associated with the data packet, and send the log to a server through one or more of the network interfaces.

Another aspect of the present disclosure is directed to a method for managing network security of a vehicle. The method may comprise receiving signals from one or more electronic control units (ECUs) via a controller area network (CAN) bus and one or more infotainment devices, and detecting a security event based at least in part on the received signals.

Another aspect of the present disclosure is directed to a non-transitory computer-readable storage medium for managing network security of a vehicle, configured with instructions executable by one or more processors to cause the one or more processors to perform operations. The operations may comprise receiving signals from one or more electronic control units (ECUs) via a controller area network (CAN) bus and one or more infotainment devices and detecting a security event based at least in part on the received signals.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings.

DETAILED DESCRIPTION

Figure 1:
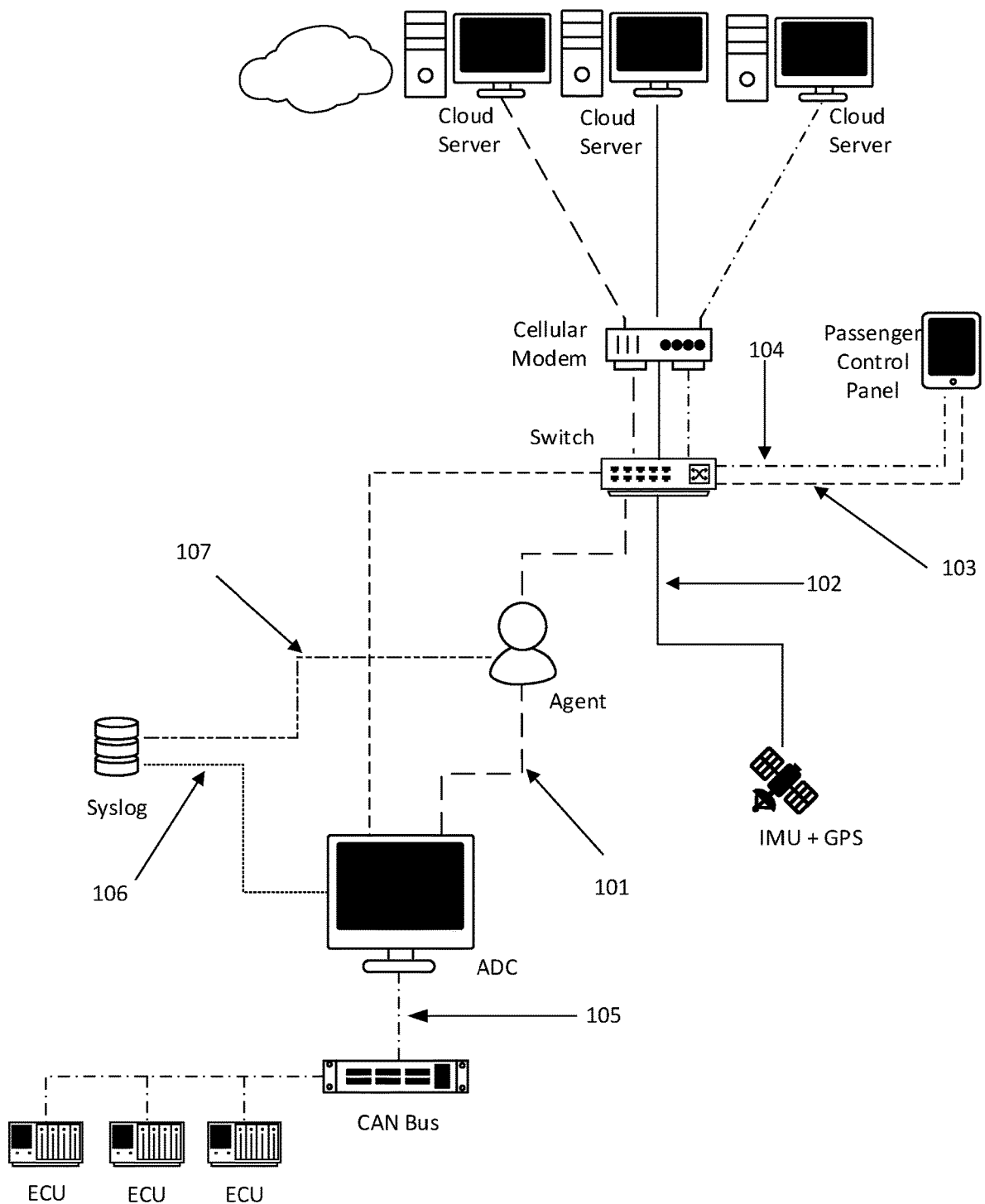
FIG. 1 illustrates an example network environment associated with a vehicle.

Specific, non-limiting embodiments of the present invention will now be described with reference to the drawings. Particular features and aspects of any embodiment disclosed herein may be used and/or combined with particular features and aspects of any other embodiment disclosed herein. It should be understood that such embodiments are by way of example and are merely illustrative of a number of embodiments within the scope of the present invention. Various changes and modifications obvious to one skilled in the art to which the present invention pertains are deemed to be within the spirit, scope and contemplation of the present invention as further defined in the appended claims.

In some embodiments, a security gateway may be used to manage network security for a vehicle. In some embodiments, the security gateway may be connected to a plurality of electronic devices associated with the vehicle including, for example, an ADS, an infotainment system, a user panel, an electronic control unit (ECU), a sensor, or a storage device, a cellular module, a Wi-Fi module, a security agent, a switch, one or more other suitable devices, or any combination thereof. The security gateway may receive data from a plurality of networks including, for example, a Wi-Fi network, a cellular network, a Bluetooth network, a CAN, another suitable network, or any combination thereof. The security gateway may be configured to route, process, filter, block, inspect, or perform one or more other suitable operations on the network traffic. Specifically, the security gateway may segment the networks associated with the vehicle, so that data traffic do not flow freely among the various components, but rather is controlled by the security gateway. The security gateway may analyze data flowing through it to identify security risks and generate logs, alerts, or reports regarding the identified security risks. The security gateway may also perform translation of network messages according to different protocols (e.g., IP to CAN) and carry out functionalities such as vehicle video monitoring and passenger vehicle authentication.

Particular embodiments provide improved network traffic protection in the context of an autonomous or connected vehicle. By segmenting the network traffic, the security gateway may prevent the threat to one device associated with the vehicle when another is compromised. Furthermore, because the security gateway is configured to process traffic from different networks using different protocols, it protects the components controlling the vehicle (e.g., the ADS) as well as components for entertainment and communication (e.g., the infotainment system). It may also analyze and correlate signals from different sources to identify security events that may not be identified by a security device configured to process any one kind of data. Additionally, because various security functionalities are aggregated in one security gateway, changes and updates to such functionalities can be carried out in a smooth and efficient way and security features may be conveniently added to or removed from the security gateway.

FIG. 1 illustrates an example network environment associated with a vehicle. As shown in FIG. 1, network traffic may occur among a plurality of devices or systems internal to or external to a vehicle. Such network traffic may comprise data flow 101 between an autonomous driving controller (ADC) and a cloud server. The data flow 101 may comprise, for example, operation and status reports generated by the ADC, remote intervention commands generated by the cloud server, configuration changes and updates provided by the cloud server, other suitable information, or any combination thereof. The data flow 101 may pass through a security agent and a network interface (e.g., a cellular modem).

In some embodiments, the network traffic may also comprise data flow 102 between one or more inertial measurement units (IMUs) or one or more GPS modules associated with the vehicle and a cloud server. The data flow 102 may comprise, for example, data generated by the IMUs, data received by the GPS modules, calibration data from the cloud server, other suitable information, or any combination thereof.

In some embodiments, the network traffic may comprise data flow 103 between a passenger control panel and the ADC. The data flow 103 may comprise status information associated with the vehicle that is provided by the ADC, commands and instructions for the vehicle inputted by a user using the passenger control panel, secure shell (SSH) access requests and communications, other suitable information, or any combination thereof.

In some embodiments, the network traffic may comprise data flow 104 between the passenger control panel and a cloud server. The data flow 104 may comprise requests inputted by a user using the passenger control panel, information provided by the cloud serve for display on the passenger control panel, other suitable information, or any combination thereof.

In some embodiments, the network traffic may comprise data flow 105 between the ADC and one or more ECUs. The data flow 105 may be through a CAN bus. The data flow 105 may comprise vehicle control information generated by the ECUs, instructions generated by the ADC for execution by the ECUs to control the vehicle, other suitable information, or any combination thereof. Messages or reports generated by the ECUs may be forwarded to one or more cloud servers via the ADC.

In some embodiments, the network traffic may comprise data flow 106 between the ADC and a storage device (e.g., a syslog database). The data flow 106 may comprise logs generated by the ADC for storage.

The network traffic may comprise data flow 107 between the security agent and the storage device. The data flow 107 may comprise logs or alerts generated by the security agent for storage. Although this disclosure describes specific types of network traffic within a network environment associated with a vehicle, this disclosure contemplates any suitable network traffic occurring among components any suitable network environment associated with a vehicle.

The network traffic disclosed and contemplated herein may give rise to various security risks, such as virus attacks, malicious tempering, hacking, or information theft. One or more security devices (e.g., a security gateway) may be placed in the network environment to route, process, filter, block, inspect, or perform one or more other suitable operations on the network traffic.

Figure 2:
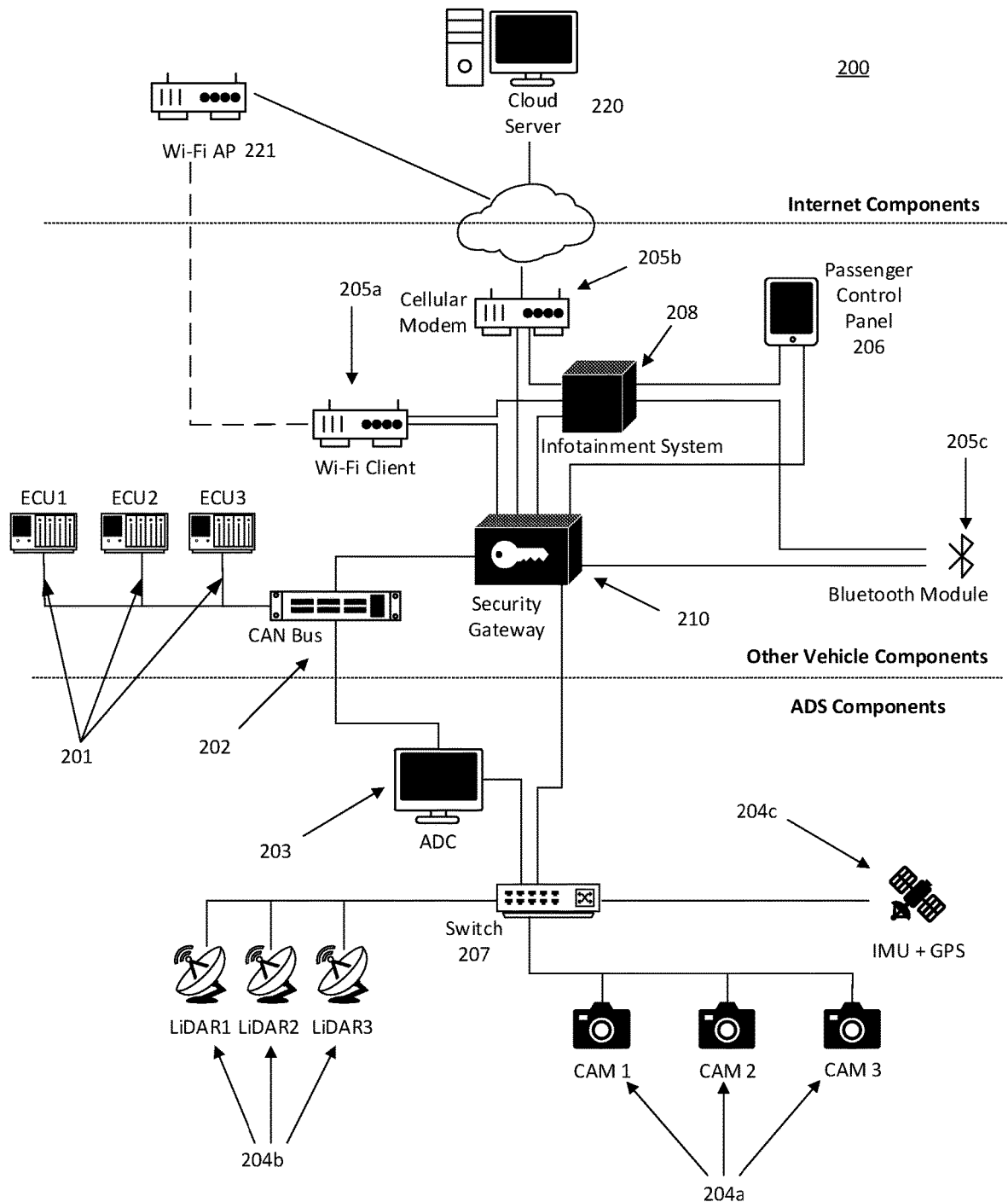
FIG. 2 illustrates an example system associated with a vehicle that comprises a security gateway for managing network security.

FIG. 2 illustrates an example system associated with a vehicle that comprises a security gateway for managing network security. In some embodiments, a system 200 may comprise a security gateway 210. The security gateway 210 may be connected or coupled to one or more ECUs 201 via a CAN bus 202. The security gateway 210 may also be connected to an infotainment system 208, which may provide a driver or passenger services such as multimedia playback, vehicle information display, navigation, other suitable functionalities, or any combination thereof. The security gateway 210 may further be connected to a passenger control panel 206, which may provide an interface for a passenger to obtain information about the vehicle and control certain operations of the vehicle. The security gateway 210 may also be connected to one or more network interfaces, such as one or more Wi-Fi clients 205a connected to one or more Wi-Fi access points 221, one or more cellular modems 205b, one or more Bluetooth Modules 205c, other suitable network interfaces, or any combination thereof. The infotainment system 208, the passenger control panel 206, and other components in the vehicle may also be connected to the network interfaces. Connections may be established between in-vehicle devices and a cloud using one or more of the network interfaces. Data may be sent to or received from a cloud server 220 via one or more of the network interfaces.

In some embodiments, the security gateway 210 may be connected to an ADS. The security gateway 210 may be connected to an ADC 203 and one or more sensors, such as one or more cameras 204a, one or more LiDAR sensors 204b, one or more IMUs or GPS modules 204c, one or more radar sensors, other suitable sensors, or any combination thereof. The data collected by the sensors may be controlled by a switch 207. The ADC may be connected to the sensors via the switch 207 and to the ECUs 201 via the CAN bus 202. Because the security gateway 210 may be directly connected to the sensors and the CAN bus 202, it may directly forward their data to the cloud server 220, thus relieving the ADC 203 of the data overhead associated with sending the data to the cloud server 220. The connections among the components disclosed herein may be wired or wireless. Although this disclosure describes particular devices in a system associated with a vehicle and particular connections among the devices, this disclosure contemplates any suitable devices and any suitable connections associated in a system associated with a vehicle.

In some embodiments, the security gateway 210 may be configured to receive signals from a plurality of components of the system 200. For example, the security gateway 210 may receive signals from the ECUs 201 and the ADC 203 via the CAN bus 202. The security gateway 210 may receive signals from one or more of the sensors, the infotainment system 208, the passenger control panel 206, and one or more of the network interfaces.

In some embodiments, the security gateway 210 may detect a security event based at least in part on received signals. A security event may comprise, for example, unauthorized access or modification to data stored in one or more devices, unauthorized installation of software or applications, malfunctioning of one or more devices, unavailability of one or more devices, control of the vehicle by unauthorized persons or entities, other suitable security events, or any combination thereof. Upon detecting a security event, the security gateway 210 may generate an alert or log. The alert or log may be saved to a storage device associated with the vehicle or sent to a cloud server 220.

In some embodiments, the security gateway 210 may be configured to perform correlation analysis on the signals from the CAN bus 202 and the signals from the one or more infotainment devices 208, and detect a security event based on a result of the correlation analysis. As an example and not by way of limitation, the security gateway 210 may receive a report indicating unauthorized access to a data storage location associated with the infotainment system 208. At a similar time, the security gateway 210 may receive signals from the ECUs 201 via the CAN bus 202 indicating that the vehicle is recently turned on but is not moving. Based on such information 208, the security gateway 210 may determine that the vehicle is under local attack by a person within the vehicle. The security gateway 210 may automatically send an alert to a cloud server 220 to report this security event. The security gateway 210 may also take one or more emergency measures such as shutting down and lock the vehicle, by sending corresponding instructions to the ECUs.

In some embodiments, the security gateway 210 may be connected to the ADC 203, which is coupled to the ECUs 201 via the CAN bus 202. In some embodiments the security gateway 210 may be configured to receive one or more signals from the ADC 203 and detect a security event further based on the one or more signals from the ADC 203. For example, the security gateway 210 may receive one or more CAN bus messages for delivery to the ADC 203. The security gateway 210 may determine that the CAN bus messages calls for a protected storage location of software code associated with the ADC 203. The security gateway 210 may determine that a security event has occurred to the ADC 203. It may generate a log associated with the security event for storage. In some embodiments, the system 200 may comprise a backup ADC. When the security gateway 210 determines that an ADC 203 is compromised, it may block the ADC 203 from controlling the vehicle and activate the backup ADC.

In some embodiments, the security gateway 210 may be connected to one or more sensors associated with the vehicle. The sensors may comprise one or more image sensors 204a, one or more radar sensors, one or more light detection and ranging (LiDAR) sensors 204b, one or more ultrasonic sensors, one or more inertial measurement units or GPS receivers 204c, other suitable sensors, or any combination thereof. The security gateway 210 may be further configured to receive one or more signals from the one or more sensors and detect a security event further based on the one or more signals from the one or more sensors. The signals received from the one or more sensors may be used individually or in combination with signals received from other components (e.g., the CAN bus 202, the infotainment system 208) to detect a security event.

In some embodiments, the security gateway 210 may be connected to one or more network interfaces. The security gateway 210 may be further configured to receive one or more signals from the one or more network interfaces and detect a security event further based on the one or more signals from the one or more network interfaces. The signals received from the one or more network interfaces may be used individually or in combination with signals received from other components (e.g., the CAN bus 202, the infotainment system 208, the sensors) to detect a security event.

In some embodiments, the security gateway 210 may be further configured to verify an identity of a person in the vehicle based at least in part on signals from the one or more sensors or one or more network interfaces. For example, the identity of a person may be verified by comparing a facial image captured by a camera 204a with an original facial image previously stored in the system 200. The verification result based on camera data may be supplemented by GPS data. The security gateway 210 may determine, based on GPS signals, whether the vehicle is on one or more routes that the person frequents. If so, the identity of the person may be confirmed. When the signal from the GPS device is used for identity verification, the signals may go through an anti-spoofing process to prevent GPS cheatings, such as cheating with fake location or using false signal to override the GPS signal. Furthermore, the security gateway 210 may verify the identity of the person based on credentials received by one or more network interfaces (e.g., Bluetooth ID of a mobile device), the infotainment system 208 (e.g., address book of a mobile device), or the passenger control panel 206 (e.g., a user name and password inputted).

In some embodiments, one or more signals from one or more network interfaces may comprise a data packet corresponding to a network address. The security gateway 210 may further be configured to determine that the network address is not among a plurality of pre-stored network addresses, generate a log associated with the data packet, and send the log to a server through one or more of the network interfaces.

Figure 3:
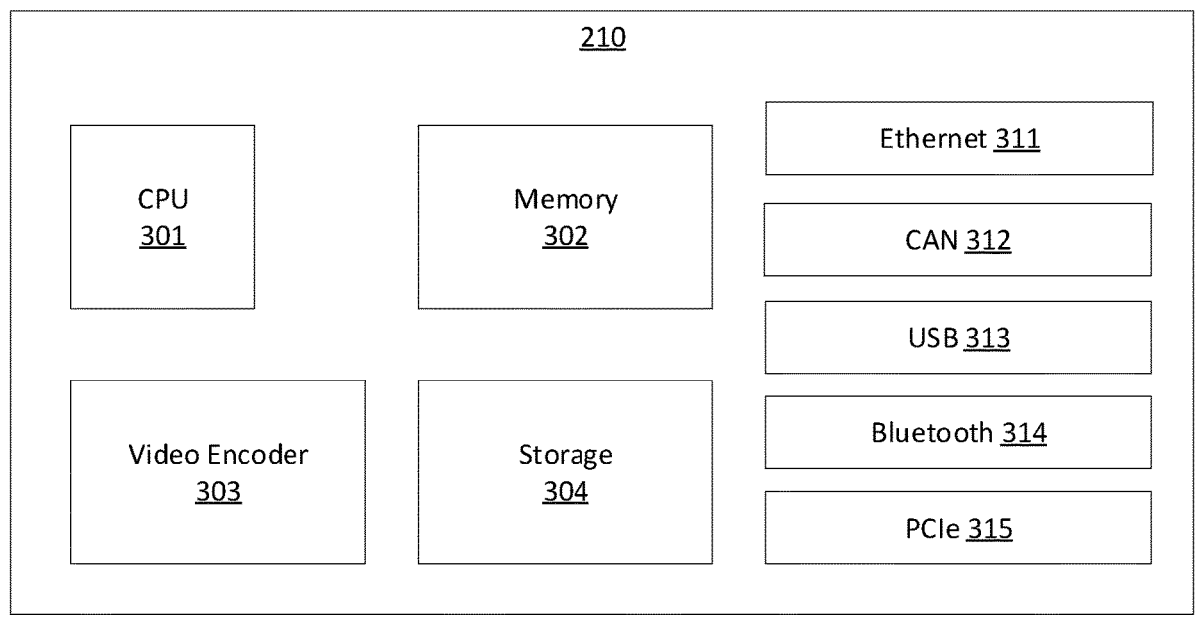
FIG. 3 illustrates an example structure of a security gateway.

FIG. 3 illustrates an example structure of a security gateway. In some embodiments, a security gateway 210 may comprises one or more processors (e.g., CPUs) 301, one or more memory devices 302, one or more video encoders 303, and one or more storage devices 304. The security gateway may further comprise one or more input/output (I/O) interfaces for connecting to other devices associated with a vehicle. In some embodiments, the security gateway 210 may comprise one or more ethernet ports 311. The ethernet ports may be used to connect to one or more networking devices such as a cellular modem or a WiFi client. In some embodiments, the security gateway 210 may comprise one or more CAN ports 312, which may be used to connect to a CAN bus gateway. In some embodiments, the security gateway 210 may comprise one or more USB ports 313, which may be used to connect to one or more USB-based storage devices. In some embodiments, the security gateway 210 may comprise one or more Bluetooth modules 314, which may be used to connect to one or more electronic devices supporting the Bluetooth protocol. In some embodiments, the security gateway 210 may comprise one or more PCIe buses. It may be connected to one or more external devices (e.g., graphics cards, hard drives, SSDs, WiFi chipsets). The components of the security gateway 210 may allow it to be simultaneously connected to various electronic devices in a vehicle as well as various electronic devices external to the vehicle via networks. The security gateway 210 may store and process the data from the electronic devices and feed its outputs to such devices.

In some embodiments, the security gateway 210 may be configured to implement a plurality of functionalities. In some embodiments, the security gateway 210 may be configured to segment a vehicle network by separately processing, forwarding, screening, or filtering data received from its various I/O interfaces. In some embodiments, the security gateway 210 may create different virtual machines (VMs) or containers to handle data from different components in order to achieve the segmentation. For example, logs of security events associated with one VM may be stored into another VM to prevent deletion by an attacker. The security gateway 210 may specifically isolate components such as a cloud server 209 associated with the vehicle, an ADC 203, a passenger control panel 208, an infotainment system 206, one or more wireless interfaces 207, a CAN bus 202, another suitable component, or any combination thereof. In this manner, the security gateway 210 may mitigate security risks associated with unprotected communication between different components of the vehicle network. When a particular component is compromised, it may be reset or reprogramed without affecting other components.

In some embodiments, the security gateway 210 may be configured to secure external and internal IP communications and collect and filter CAN bus messages. The security gateway 210 may be configured to detect unauthorized traffic between a plurality of components associated with a vehicle, to capture traffic between such different components, to detect unauthorized connection attempts to one or more components associated with the vehicle, to collect traffic of such unauthorized connection attempts, to download a core dump, to monitor status of one or more components or applications associated with the vehicle, to detect operating system or application access violations, to store logs of security events and send such logs to the cloud, to search stored logs, to establish SSH (secure shell) access from a cloud server to one or more virtual machines or computers associated with the vehicle, or to carry out other suitable actions.

In some embodiments, the security gateway 210 may allocate network bandwidth among traffic of different nature based on priority levels associated with the traffic. In some embodiments, the security gateway may be configured to translate one or more IP messages to CAN bus messages or translate one or more CAN bus messages to IP messages. The security gateway may also be configured to perform video-based monitoring of the vehicle or passenger-vehicle authentication.

Figure 4:
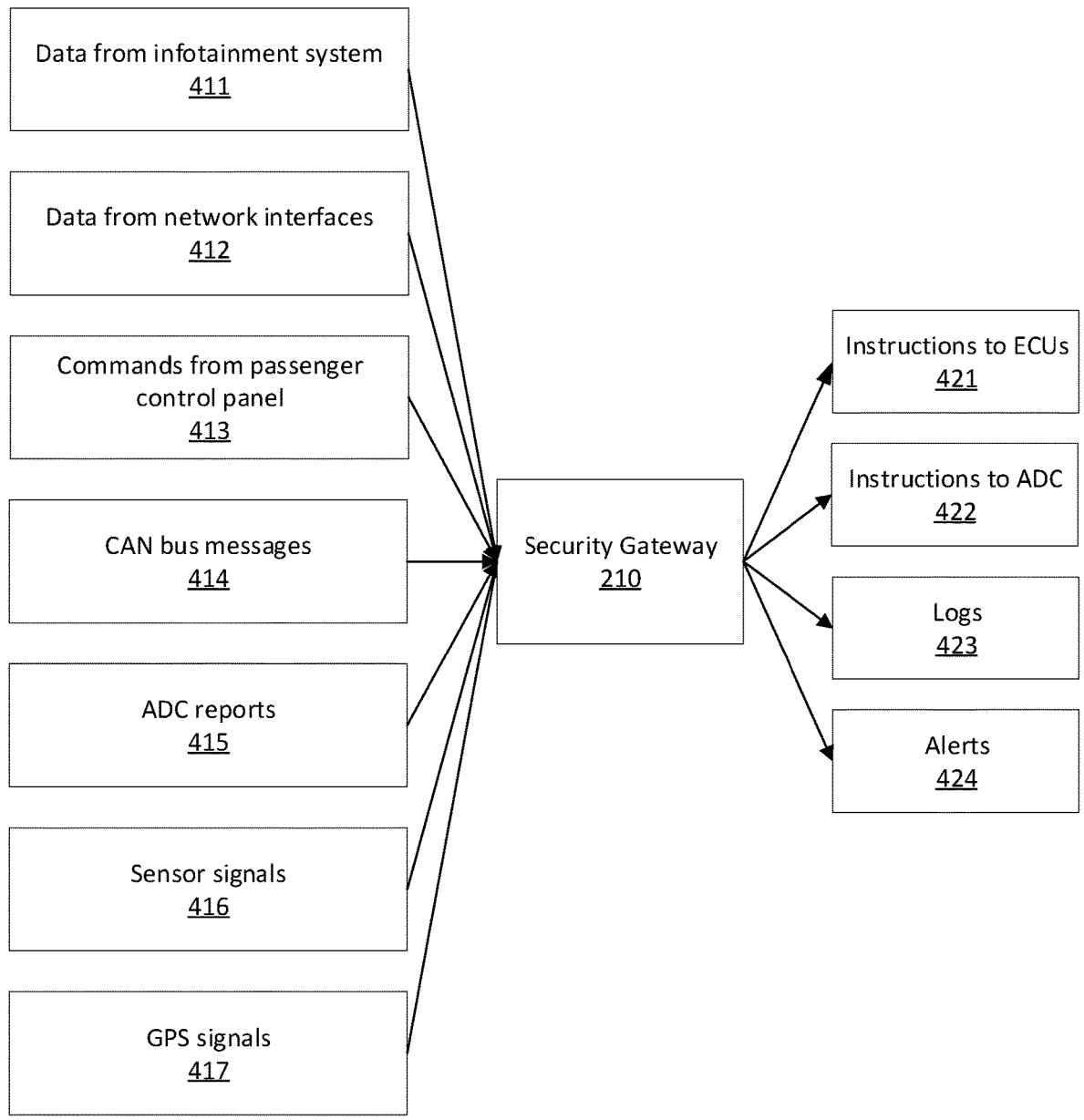
FIG. 4 illustrates example inputs that the security gateway is configured to receive and example outputs that the security gateway is configured to generate and send.

FIG. 4 illustrates example inputs that the security gateway is configured to receive and example outputs that the security gateway is configured to generate and send. In some embodiments, a security gateway 210 may be configured to receive various inputs from various devices associated with a vehicle. For example, the security gateway 210 may receive data from an infotainment system associated with the vehicle 411, data from one or more network interfaces 412, one or more commands from a passenger control panel 413, one or more CAN bus messages 414, one or more reports from an ADC 415, signals from one or more sensors 416, one or more GPS signals 417, other suitable signals, or any combination thereof. The security gateway 210 may synthesize or process data from one or more of the sources to generate one or more types of outputs. For example, the outputs generated by the security gateway may comprise instructions to one or more ECUs, instructions to the ADC, one or more logs, one or more alerts, other suitable outputs, or any combination thereof.

In some embodiments, an output from the security gateway 210 may be based on inputs from one or more sources. In some embodiments, the security gateway 210 may inspect data traffic from the infotainment system 411, data traffic from one or more network interfaces 412, data traffic from the passenger control panel 413, data traffic from one or more sensors 416, or data traffic from another suitable device that may be compromised by hacking activities. In some embodiments, the security gateway 210 may capture data traffic from one or more of the aforementioned sources. It may extract fingerprints from the data traffic. The fingerprint may depend on a protocol associated with the data traffic. The fingerprints may be compared with known fingerprints stored in one or more databases associated with the vehicle or one or more network servers associated with the vehicle. If the extracted fingerprints are not among those stored in the databases, a syslog message may be generated and sent to a server associated with the security gateway 210. Additionally or alternatively, the security gateway 210 may generate one or more commands that can be executed to block the captured data traffic.

In some embodiments, the security gateway 210 may specifically inspect data traffic from one or more network interfaces 412. The data traffic may comprise one or more data packets based on the TCP/IP protocol. The security gateway 210 may determine an IP address associated with each of the data packets and compare the IP address with one or more pre-stored IP addresses. In some embodiments, the pre-stored IP addresses may correspond to, for example, a GPS server associated with the vehicle or a server associated with the ADS of the vehicle. If the determined IP address is not found among the pre-stored IP addresses, the security gateway 210 may block the corresponding data packet. The security gateway 210 may also generate a log or an alert associated with the data packet and send the log or alert to a server associated with the security gateway 210.

In some embodiments, the security gateway 210 may obtain one or more commands from the passenger control panel 413. It may check and validate one or more aspects of the commands 413. For example, the security gateway 210 may check and determine if the commands 413 contain prohibited characters or are too long. It may also check if a type of the command falls within a list of allowed types of requests. The security gateway 210 may block the commands 413 if they fail to satisfy one or more requirements.

In some embodiments, the security gateway 210 may control priority of data traffic from or to one or more of the aforementioned sources. The security gateway 210 may receive one or more data streams from one or more of the sources and determine a priority level associated with each of the data streams. The security gateway 210 may assign bandwidth to each of the data streams according to the priority levels.

In some embodiments, the security gateway 210 may receive one or more CAN bus messages 414. The CAN bus messages may be generated by one or more ECUs associated with the vehicle. The security gateway 210 may detect, based on the CAN bus messages, an anomaly associated with one or more components of the vehicle. The security gateway 210 may generate logs recording the anomaly and send such logs to a cloud server for further processing. Additionally or alternatively, the security gateway 210 may send instructions 421 to one or more of the ECUs to address the detected anomaly. For example, in response to a detection of engine malfunctioning, the security gateway 210 may send instructions to ECUs to cause emergency braking of the vehicle.

In some embodiments, the security gateway 210 may receive one or more reports 415 from an ADC associated with the vehicle and signals 416 from one or more sensors associated with the vehicle. The security gateway 210 may detect one or more security events associated with the ADC based on these signals. For example, the security gateway 210 may detect a potential breach of the ADC if the sensor signals 416 suggest an obstacle in front of vehicle and the ADC reports 415 suggest that the ADC 203 is controlling the vehicle to accelerate. In such a situation, the security gateway 210 may generate one or more alerts and send such alerts to one or more cloud servers 209. The security gateway 210 may send instructions to the ADC 203 to override its current actions and perform emergency brake on the vehicle.

In some embodiments, the security gateway 210 may receive video signals from one or more cameras 205*a* associated with the vehicle. The security gateway 210 may process the video data (e.g., encoding the video data using the video encoder 303) and send the processed video data to one or more cloud servers 209. The cloud servers 209 may process the video data (e.g., identification of individuals/activities) to identify potential security events (e.g., break-in). Alternatively, the security gateway 210 may locally process the video data to identify potential security events and send information about any identified security event to one or more cloud servers 209.

In some embodiments, the security gateway 210 may leverage sensor signals 416, GPS signals 417, infotainment system data 411, passenger control panel 413, or other suitable data to identify a person in proximity to the vehicle. Such identification may be based on, for example, one or more images captured of the person, a location of the person, credentials of the person inputted in the passenger control panel 208, identification information of a mobile device of the person as gathered by the infotainment system 206. The security gateway 210 may unlock or activate certain functionalities of the vehicle based on successfully verification of the identity of a person in the vehicle.

Figure 5:
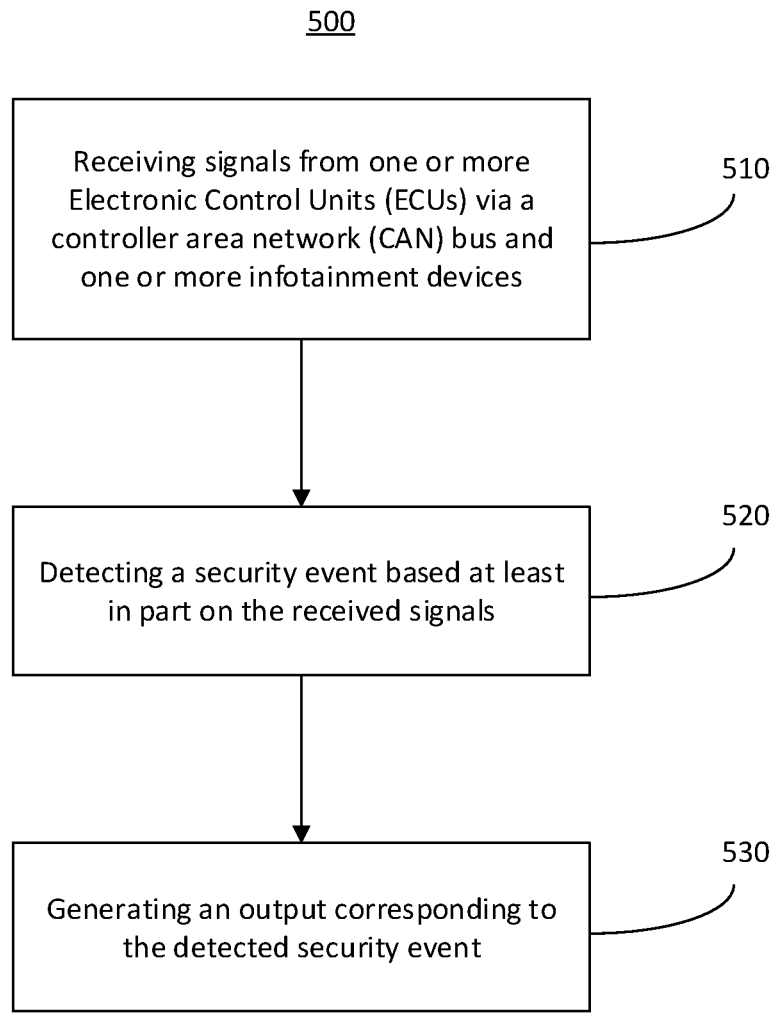
FIG. 5 illustrates an example method for managing network security of a vehicle.

FIG. 5 illustrates an example method for managing network security of a vehicle. The method 500 may be implemented in any suitable environment (e.g., the system 200 of FIG. 2). The operations of the method 500 presented below are intended to be illustrative. Depending on the implementation, the method 500 may include additional, fewer, or alternative steps performed in various orders or in parallel. The method 500 may be implemented in various computing systems or devices including one or more processors.

As shown in FIG. 5, the method 500 may begin at step 510, where a security gateway 210 may receive signals from one or more ECUs via a CAN bus and one or more infotainment devices. At step 520, the security gateway 210 may detect a security event based at least in part on the received signals. At step 530, the security gateway 210 may generate an output corresponding to the detected security event.

In some embodiments, detecting a security event may comprise performing correlation analysis on the signals from the CAN bus and the signals from the one or more infotainment devices and detecting the security event based on a result of the correlation analysis.

In some embodiments, the method may further comprise receiving one or more signals from ADC coupled to the ECUs via the CAN bus. The detecting a security event may be further based on the one or more signals from the ADC.

In some embodiments, the method may further comprise receiving one or more signals from one or more sensors associated with the vehicle. Detecting a security event may be further based on the one or more signals from the one or more sensors.

In some embodiments, the one or more sensors may comprise one or more image sensors, one or more radar sensors, one or more LiDAR sensors, one or more ultrasonic sensors, one or more inertial measurement units, or one or more GPS receivers.

In some embodiments, the method may further comprise verifying an identity of a person in the vehicle based at least in part on the one or more signals from the one or more sensors.

In some embodiments, the method may further comprise receiving one or more signals from one or more network interfaces. The detecting a security event may be further based on the one or more signals from the one or more network interfaces.

In some embodiments, the one or more network interfaces may comprise a Wi-Fi client, a cellular modem, or a Bluetooth module.

In some embodiments, the one or more signals may comprise a data packet corresponding to a network address. The method may further comprise determining that the network address is not among a plurality of pre-stored network addresses, generating a log associated with the data packet, and sending the log to a server through one or more of the network interfaces.

Figure 6:
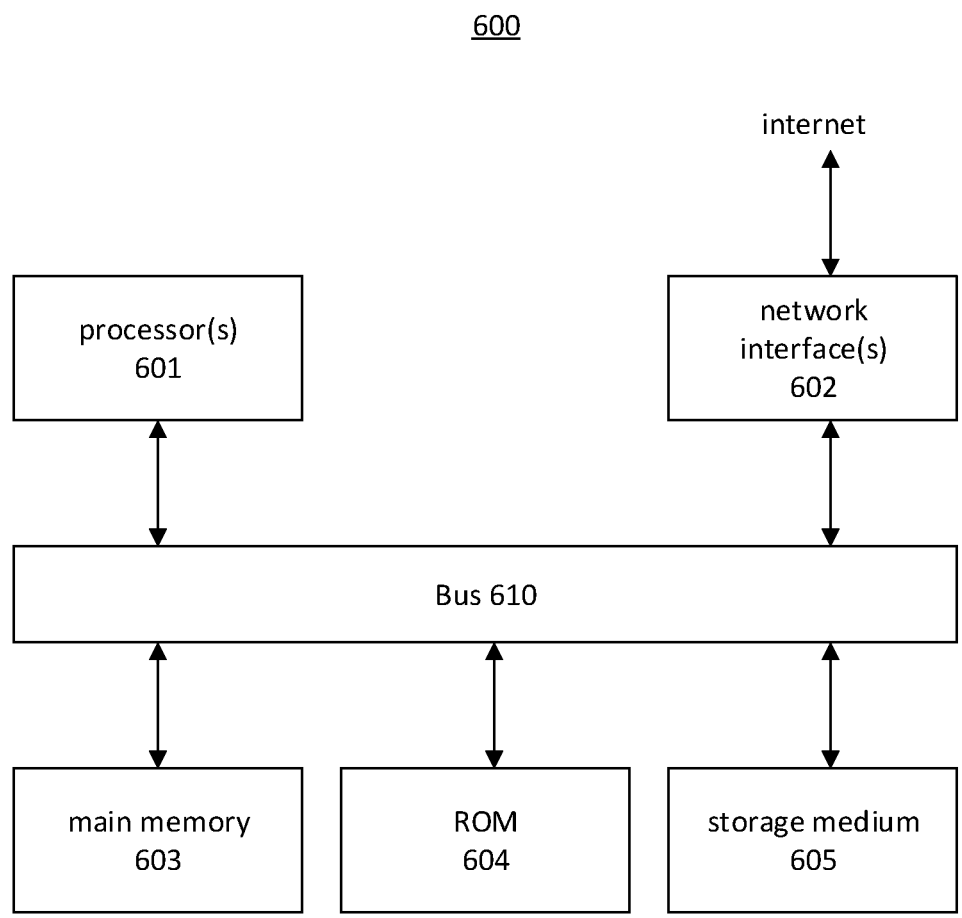
FIG. 6 illustrates a computer system upon which any of the embodiments described herein may be implemented.

FIG. 6 illustrates an example computer system. Various devices described in this specification, such as devices associated with the cloud server 220, the passenger control panel 206, the infotainment system 208, or the ADC 203, may be at least partially implemented as such a computer system 600. The computer system 600 may include a bus 610 or other communication mechanism for communicating information, one or more hardware processors 601 coupled with the bus 610 for processing information. Hardware processor(s) 601 may be, for example, one or more general purpose microprocessors.

The computer system 600 may also include a main memory 603, such as a random access memory (RAM), cache and/or other dynamic storage devices, coupled to the bus 610 for storing information and instructions to be executed by processor(s) 601. Main memory 603 may be used for storing temporary variables or other intermediate information during execution of instructions to be executed by processor(s) 601. Such instructions, when stored in storage media accessible to processor(s) 601, render computer system 600 into a special-purpose machine that is customized to perform the operations specified in the instructions. Main memory 603 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 601 executing one or more sequences of one or more instructions contained in main memory 603. Such instructions may be read into main memory 603 from another storage medium, such as a storage medium 605. Execution of the sequences of instructions contained in main memory 603 causes processor(s) 601 to perform the process steps described herein.

The computer system 600 also includes a network interface 602 coupled to the bus 610. The network interface 602 may provide a two-way data communication coupling to one or more network links that are connected to one or more networks. In another example, the network interface 602 may be a local area network (LAN) card to provide a data communication connection to a compatible LAN (or WAN component to communicated with a WAN). Wireless links may also be implemented.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

What is claimed is:

1. A system associated with a vehicle, comprising:
one or more electronic control units (ECUs) connected to a controller area network (CAN) bus;
one or more infotainment devices;
one or more sensors comprising one or more image sensors and a global positioning system (GPS) receiver; and
a security gateway coupled to the one or more ECUs via the CAN bus and connected to the one or more infotainment devices and the one or more sensors, wherein the security gateway is configured to:
receive signals from the CAN bus, the one or more infotainment devices, and the one or more sensors;
verify an identity of a person in the vehicle by comparing a facial image of the person received from the one or more image sensors with a pre-stored facial image;
confirm the identity of the person by determining, based on signals received from the GPS receiver, whether the vehicle is on one or more routes associated with the person;
detect a security event based on signals received from the CAN bus and the one or more infotainment devices;
create a plurality of virtual machines (VMs) for respectively handling data from different components to achieve segmentation, the different components comprising the one or more ECUs, the one or more infotainment devices, and the one or more sensors; and store logs of security events associated with a first VM of the plurality of virtual machines into a second VM of the plurality of virtual machines to prevent deletion by an attacker.

2. The system of claim 1, wherein, to detect a security event, the security gateway is configured to:
perform correlation analysis on the signals from the CAN bus and the signals from the one or more infotainment devices; and
detect the security event based on a result of the correlation analysis.

3. The system of claim 1, wherein:
the security gateway is connected to an autonomous driving controller that is coupled to the ECUs via the CAN bus; and
the security gateway is further configured to receive one or more signals from the autonomous driving controller and detect the security event further based on the one or more signals from the autonomous driving controller.

4. The system of claim 1, wherein:
the security gateway is further configured to detect the security event further based on one or more signals from the one or more sensors.

5. The system of claim 4, wherein the one or more sensors further comprise:
one or more radar sensors;
one or more light detection and ranging (LiDAR) sensors;
one or more ultrasonic sensors; or
one or more inertial measurement units.

6. The system of claim 1, wherein:
the security gateway is connected to one or more network interfaces; and
the security gateway is further configured to receive one or more signals from the one or more network interfaces and detect the security event further based on the one or more signals from the one or more network interfaces.

7. The system of claim 6, wherein the one or more network interfaces comprise:
a Wi-Fi client;
a cellular modem; or
a Bluetooth module.

8. The system of claim 6, wherein:
the one or more signals comprise a data packet corresponding to a network address;
the security gateway is further configured to:
determine that the network address is not among a plurality of pre-stored network addresses;
generate a log associated with the data packet; and
send the log to a server through the one or more network interfaces.

9. A method for managing network security of a vehicle, comprising:
receiving signals from one or more electronic control units (ECUs) via a controller area network (CAN) bus, one or more infotainment devices, and one or more sensors, the one or more sensors comprising one or more image sensors and a global positioning system (GPS) receiver;
verifying an identity of a person in the vehicle by comparing a facial image of the person received from the one or more image sensors with a pre-stored facial image;
confirming the identity of the person by determining, based on signals received from the GPS receiver, whether the vehicle is on one or more routes associated with the person;
detecting a security event based on signals received from the one or more ECUs and the one or more infotainment devices; and
create a plurality of virtual machines (VMs) for respectively handling data received from the CAN bus, the one or more infotainment devices, and the one or more sensors.

10. The method of claim 9, wherein the detecting a security event comprises:
performing correlation analysis on the signals from the CAN bus and the signals from the one or more infotainment devices; and
detecting the security event based on a result of the correlation analysis.

11. The method of claim 9, wherein:
the method further comprises receiving one or more signals from an autonomous driving controller coupled to the ECUs via the CAN bus; and
the detecting a security event is further based on the one or more signals from the autonomous driving controller.

12. The method of claim 9, wherein:
the detecting a security event is further based on one or more signals from the one or more sensors.

13. The method of claim 12, wherein the one or more sensors comprise:
one or more radar sensors;
one or more light detection and ranging (LiDAR) sensors;
one or more ultrasonic sensors; or
one or more inertial measurement units.

14. The method of claim 9, wherein:
the method further comprises receiving one or more signals from one or more network interfaces; and
the detecting a security event is further based on the one or more signals from the one or more network interfaces.

15. The method of claim 14, wherein the one or more network interfaces comprise:
a Wi-Fi client;
a cellular modem; or
a Bluetooth module.

16. The method of claim 14, wherein:
the one or more signals comprise a data packet corresponding to a network address;
the method further comprises:
determining that the network address is not among a plurality of pre-stored network addresses;
generating a log associated with the data packet; and
sending the log to a server through the one or more network interfaces.

17. A non-transitory computer-readable storage medium for managing network security of a vehicle, configured with instructions executable by one or more processors to cause the one or more processors to perform operations comprising:
receiving signals from one or more electronic control units (ECUs) via a controller area network (CAN) bus, one or more infotainment devices, and one or more sensors, the one or more sensors comprising one or more image sensors and a GPS receiver;

verifying an identity of a person in the vehicle by comparing a facial image of the person received from the one or more image sensors with a pre-stored facial image;

confirming the identity of the person by determining, based on signals received from the GPS receiver, whether the vehicle is on one or more routes associated with the person;

detecting a security event based on signals received from one or more ECUs and the one or more infotainment devices; and create a plurality of virtual machines (VMs) for respectively handling data received from the CAN bus, the one or more infotainment devices, and the one or more sensors.

18. The medium of claim 17, wherein the detecting a security event comprises:

performing correlation analysis on the signals from the CAN bus and the signals from the one or more infotainment devices; and detecting the security event based on a result of the correlation analysis.

\* \* \* \* \*